Figure 4:
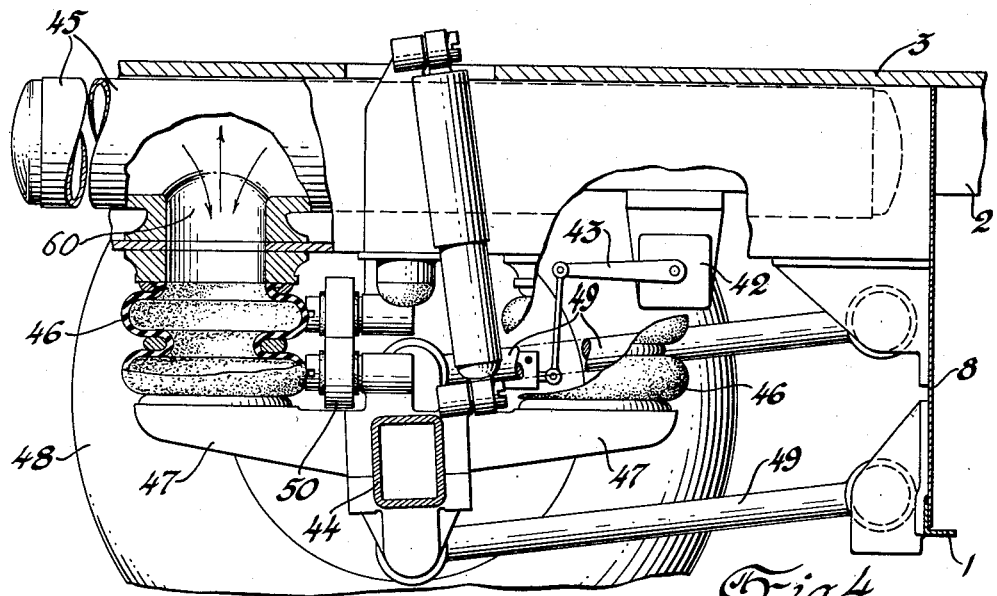

Oct. 12, 1954  H. E. FOX ET AL  2,691,420
FLUID SUSPENSION SYSTEM FOR VEHICLES
Filed July 2, 1949  5 Sheets-Sheet 1
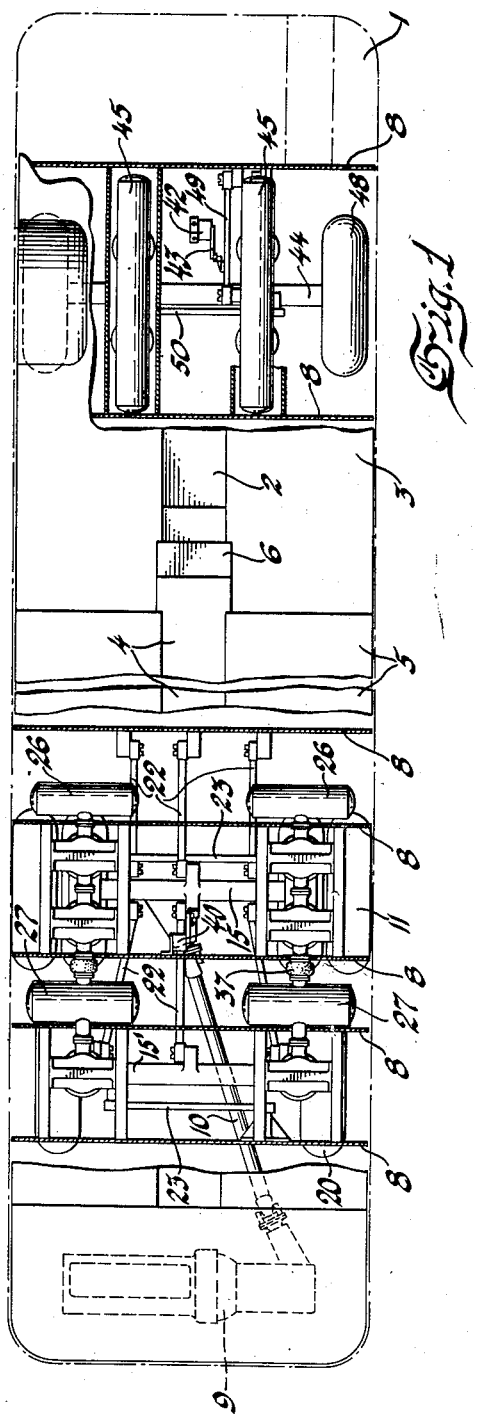
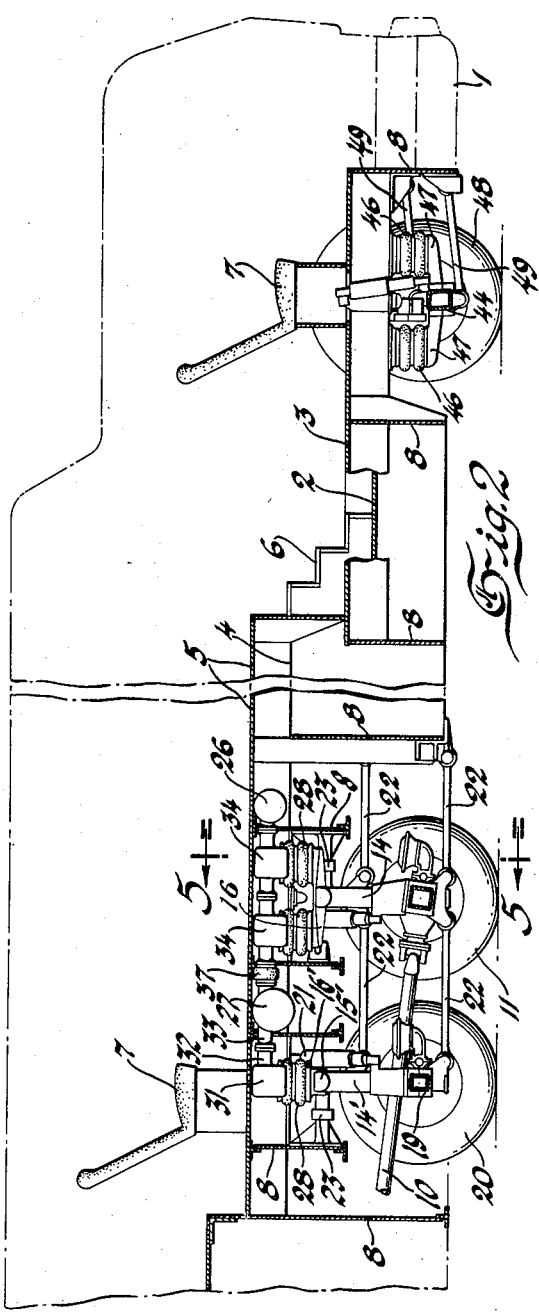
Inventors
Harold E. Fox &
William E. Rice
By Spencer, Willito, Helming & Baillio
Attorneys

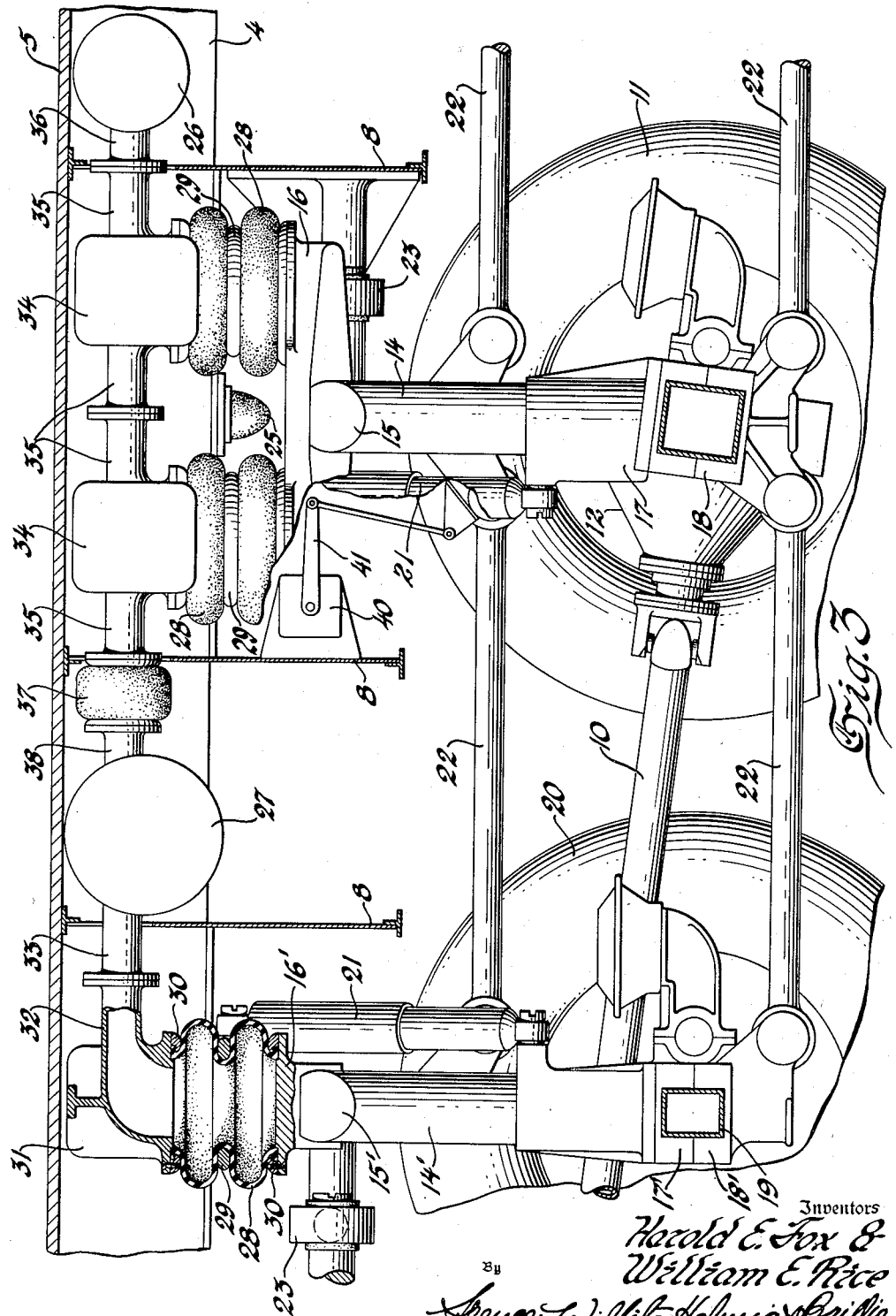

Oct. 12, 1954  H. E. FOX ET AL  2,691,420
FLUID SUSPENSION SYSTEM FOR VEHICLES
Filed July 2, 1949  5 Sheets-Sheet 3

Inventors
Harold E. Fox &
William E. Rice
By Spencer, Willits, Helwig & Baillie
Attorneys

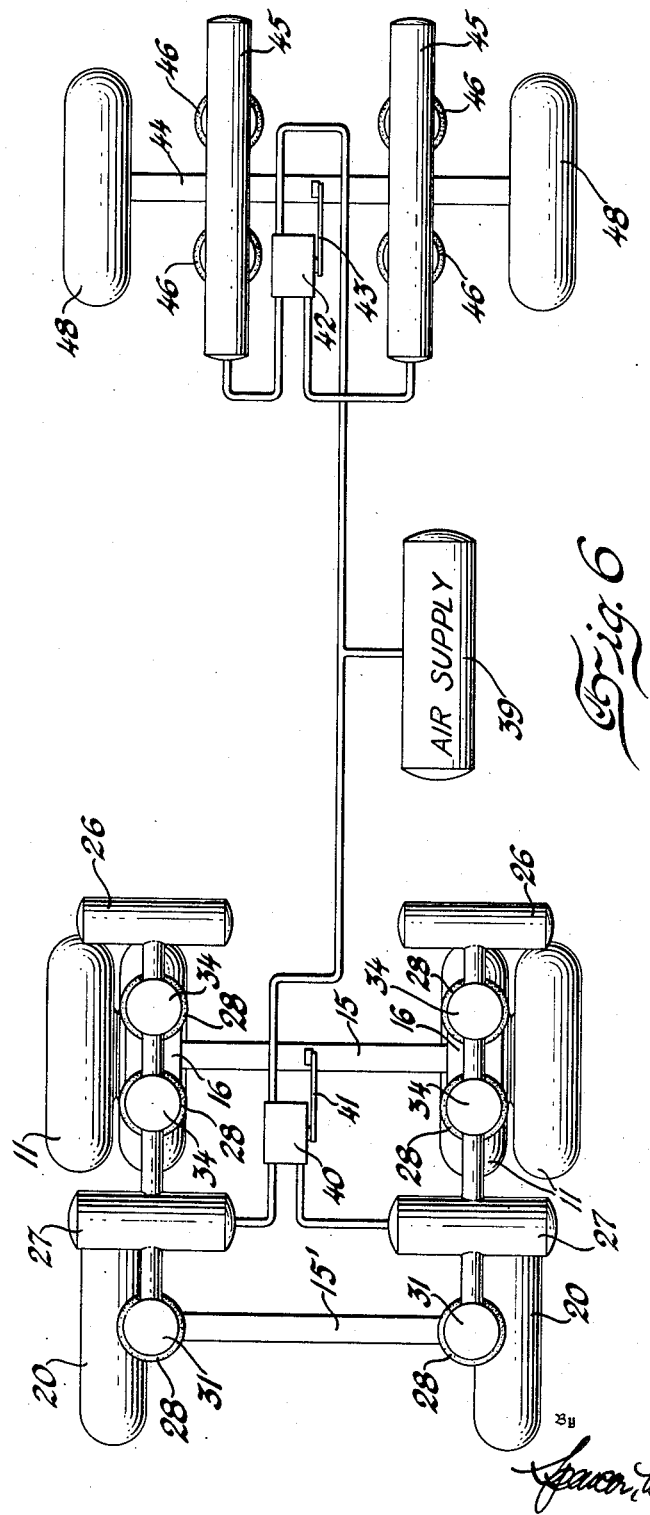

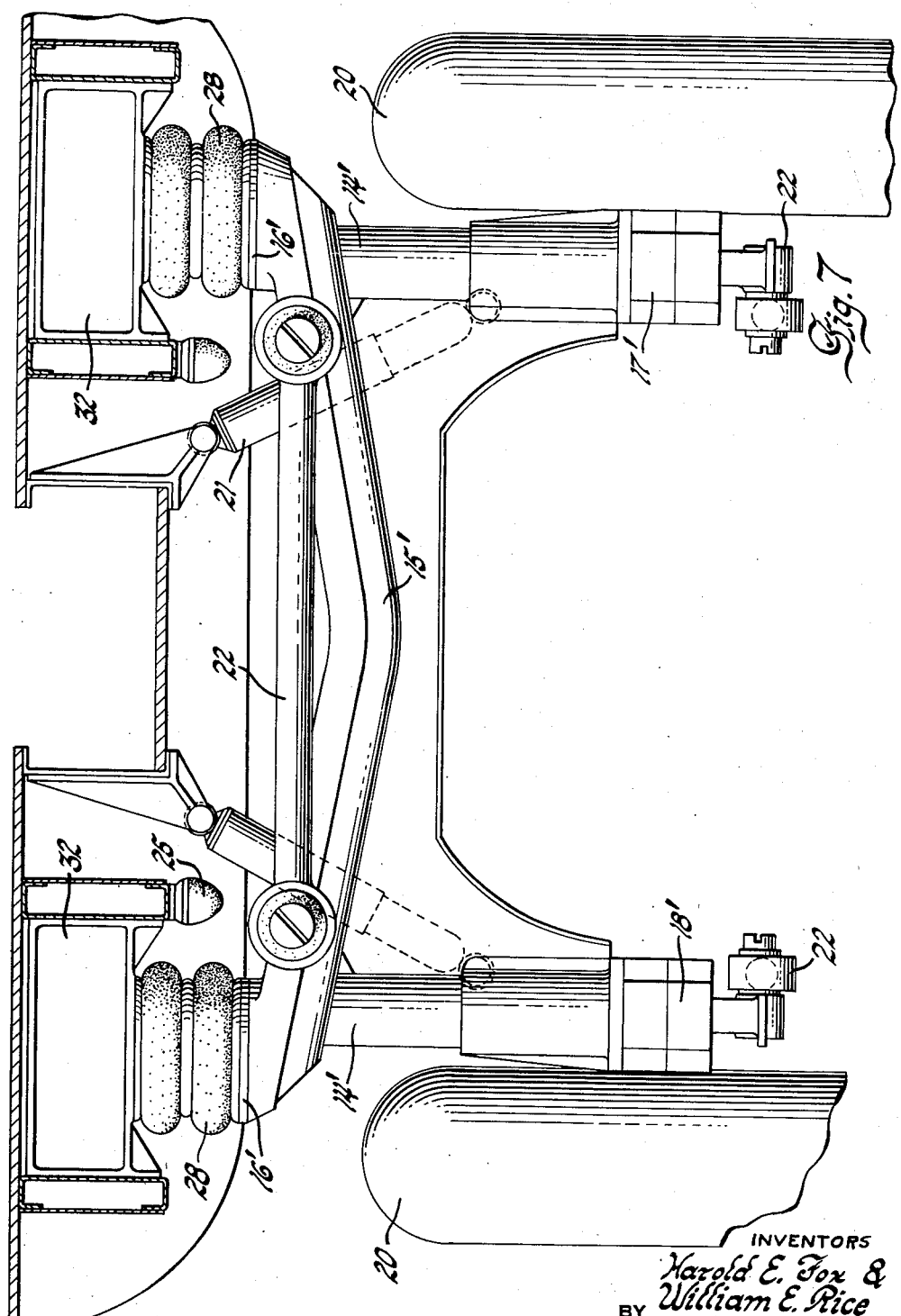

Patented Oct. 12, 1954

2,691,420

UNITED STATES PATENT OFFICE 2,691,420

FLUID SUSPENSION SYSTEM FOR VEHICLES

Harold E. Fox, Oakland County, and William E. Rice, Lakeville, Mich., assignors to General Motors Corporation, Detroit, Mich., a corporation of Delaware Application July 2, 1949, Serial No. 102,758

9 Claims. (Cl. 180—22)

This invention relates to vehicle suspension systems and more particularly to an arrangement especially designed to render more practicable the application to and installation in a large bus or motor coach of constant level pneumatic springs.

In the normal operation of mass transportation vehicles the load or number of passengers varies from time to time over a given route and between each route stop or station. Heretofore the accepted practice has been to design springs for carrying the maximum load and this gives a hard ride when the vehicle is lightly loaded and in addition the height above the ground of the loading step changes with the load. Thus if the prescribed ideal step height is set for average loading then at heavier loading it is lower than the ideal and at lighter loading it is much higher and often inconvenient and even dangerous for passengers entering or leaving the vehicle.

There has long been the urgent desire and recognized need for a satisfactory suspension which will provide both a constant level step and a properly cushioned soft ride throughout the range of loading. The elastic suspension of the load on a confined body or column of air has shown interesting promise and after an extended experimental program knowledge has been gained of the principles to be followed with respect to the sealed in air pressures, the control thereof and the construction of the parts for prolonged life. Among the problems of usage is the need to fit bulky equipment compactly within limited space without interference with the running gear and body components and with everything easily available for inspection and maintenance.

Overall considerations have led to the development of a vehicle structure in which a preferred embodiment has the load carrying body arranged with a floor on two levels, that to the rear constituting the main deck with the greater number of passenger seats and being somewhat higher than is customary in bus construction with a series of steps leading to and from a shorter length low level forward deck which mounts additional seats and affords a front loading platform conveniently beside the bus driver and readily accessible from the ground or curb through the doorway step. Beneath the body understructure the running gear includes road wheels arranged in sets on opposite ends of three axles, the front axle being under the low level floor and dirigibly carrying a pair of wheels for steering purposes and the remaining axles being in tandem relation under the high level floor at the rear of the vehicle. Of the tandem axles only one is engine driven and preferably the non-drive axle is in trailing relation and has a single wheel at each end. For increased traction dual wheels are mounted at each end of the forward drive axle and are shaft driven from centrally located differential gearing coupled with a rearwardly mounted power plant by means of a propeller shaft which extends on both sides of and is straddled by the trailing axle. One of the advantages of the forward drive and rear trailing tandem axle arrangement is that the long propeller shaft for power delivery from the engine to the axle minimizes shaft angularity upon relative vertical movement of the body and drive axle. To confine axle travel to the vertical and inasmuch as the air springs have no lateral stability, each axle is tied to the body by transverse and longitudinally extending radius rods.

In the case of the front axle the space restriction, due both to the low floor level and wheel dirigibility, has led to a floor having a depressed central aisle with raised side wings and a pair of pneumatic springs, each involving a long and narrow solid wall reservoir fitted outwardly alongside the vertical wall of the depressed aisle and in open communication with a pair of pendent and longitudinally spaced flexible bellows which at their bottoms seat against arms projected laterally on both sides of the axle. For reasons both of space limitation or interference and of utmost body stability the suspension structure at the rear includes two sets of air springs located at an elevated position above the tops of the road wheels and close to the vehicle side walls. Each rear pneumatic spring has a cushioning air volume provided by a pair of transversely disposed tanks or reservoirs and three flexible walled bellows, two of the bellows being interposed between the body and the dual wheel drive axle and the third bellows being between the body and the trailing axle having single wheels. To seat the collapsible bellows above the wheels both axles are in the nature of husky and centrally arched trusses which tower upwardly from the wheel axes and carry spring seating pads at their tops in widely spaced apart transverse relation so as to overlie the wheels and support the body near the side walls. Thus while the vehicle has three axles it is in effect floated on four sets of air columns each independent of the others and each rear column being of greater volume than the front columns and being entrapped within two inflexible and three flexible containers and the smaller volume front air column being entrapped within a single long inflexible container and the two flexible containers.

Provision is made for increasing or decreasing the pressure of each supporting air column. For increased resistance to load additional air pressure is supplied to the interiors of the sealed containers and for decreased resistance the air pressure is vented from the containers. The control is automatically taken care of in compensation for load changes by a leveling valve which responds to floor level changes of predetermined duration or which is slow acting so as to be ineffective with respect to axle deflections incident to road bumps and the valve serving either to vent or to supply additional air and thereby maintain floor level height substantially constant with respect to the ground for all load conditions. The use of two valves, one at the front of the vehicle for regulating both front springs and one at the rear for regulating both rear springs, will maintain the floor at the predetermined level even though the load is unevenly distributed between the front and rear ends. Thus should a large number of passengers be crowded in the front of the vehicle, as is likely during loading and unloading intervals, the front of the vehicle will not sink or nose down as now occurs with currently conventional springing.

Figure 5:
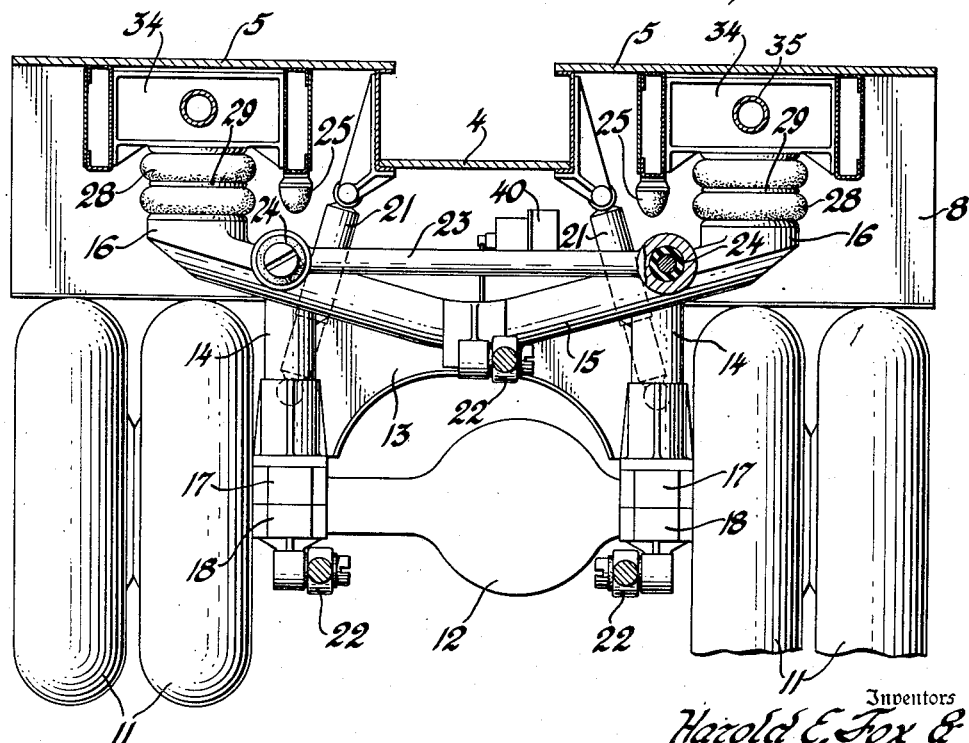

For a better explanation of the invention reference will be made to the accompanying drawings wherein Figures 1 and 2 are respectively a plan view with parts broken away and a longitudinal sectional view of a vehicle incorporating the improved suspension system; Figures 3 and 4 are enlarged side elevations of the rear and front axle suspension assemblies, respectively; Figure 5 is a transverse section with parts in elevation, as viewed on line 5—5 of Figure 2, Figure 6 is a diagrammatic plan view showing the piping arrangement for the pneumatic spring suspension system and Fig. 7 is a rear elevational view showing the trailing axle and associated parts.

As illustrated the vehicle body is of the type having a front doorway opposite the driver's seat and the height above the ground of the doorway step 1 is proposed to be maintained at a level which will not vary more than approximately one-quarter of one inch regardless of vehicle loading. The step 1 is associated with a loading or fare collecting platform and leading rearwardly therefrom is a floor section, including a depressed central aisle 2 and raised seating decks 3 on both sides of the aisle. A similarly arranged floor section having a depressed aisle 4 and side seating decks 5 is on a higher lever and is longer than the forward floor section and constitutes the main passenger carrying portion of the two level floor structure. Central aisle stair steps 6 join the two levels and the side decks in each instance carry a succession of passenger seats 7 of the group of which only one is shown on each level. In addition to the high and low level floor sections the body understructure includes suitable stiffening elements or vertical plates 8—8 extending transversely across the vehicle and being spaced apart longitudinally. These truss plates 8 in the central longitudinal region of the body also afford partitions between a group of underfloor compartments which serve as stowage space for baggage and as enclosures for air conditioning equipment, fuel and storage tanks and the like. In cooperation with the rear wall of the body the rearmost plate 8 defines an underfloor housing for the power plant, indicated at 9 as a transversely disposed engine and gearbox assembly from the output end of which there extends angularly forward a long propeller shaft 10 to a differential gearing forming a part of the drive or traction axle.

As best seen in Figure 5 the traction axle has dual wheels 11—11 mounted on opposite ends thereof and includes a hollow housing having an enlarged central bowl 12 for the differential gearing and a pair of rigid arms extending outwardly from the bowl and enclosing axle drive shafts in the conventional manner. Additionally the axle includes a weight transmitting member or vertical riser which may comprise a large solid casing or a number of parts welded together for mutual strengthening purposes. This vertical riser includes a centrally arched or web portion 13 in bridging relation to the differential housing 12 with its lower edge formed with a reinforcing flange and with its opposite side edges terminating in or joined to a pair of upstanding tubes or towers 14—14 whose upper ends are joined to a transverse tubular member 15 along the top edge of the webbing 13 and which diverge outwardly from the center of the axle assembly with their extremities projecting beyond the side towers 14—14 over and in vertically spaced relation above the tops of the wheels 11—11. In the case of the driving axle the extremities of the transverse tube 15 terminate in oppositely extending arms 16 to afford a pair of longitudinally spaced apart spring seats over the wheels. At their lower ends the upstanding side tubes 14—14 carry saddles 17 which rest upon the rigid arms of the drive axle housing 12 and are secured thereto by detachable bearing caps 18.

A generally similar axle assembly is employed for the rear trailing axle in that there is utilized a vertical stiffening webbing joining the central regions of an upper transverse load carrying tube 15' which terminates in spring seats spaced above the tops of the wheels and a pair of side towers 14' whose feet terminate in bearing 17' and detachable caps 18'. The rear trailing axle differs from the drive axle structure in that single spring seats 16' are formed at the opposite ends of the transverse tube 15' and in addition stub axle sections 19 are clamped at their inner ends between the blocks 17' and 18' and extend outwardly for rotatably mounting the trailing wheels 20. Thus with the use of the stub axles and the centrally arched axle the central area in alignment with the wheel axis is unoccupied except for the drive propeller shaft 10 which is straddled by the trailing axle and encounters no interference to its functioning during deflection of either or both of the tandem axles.

Telescopic shock absorbers 21 are interposed between the body and each axle. To maintain the axles in proper parallelism and also to resist axle torque there are provided a series of longitudinally extending radius rods 22—22, arranged in sets of three each with those of one set pivotally connected at opposite ends to the driving axle and the body and those of the other set being pivotally joined at opposite ends to the driving axle and the trailing axle. In each set two of the rods are below the axis of the wheel and are transversely spaced apart and the remaining rod is positioned above the wheel axis and centrally of the assembly. For lateral stability transverse radius rods 23 connect each axle to the body by pivotal joints at their opposite ends. Each pivotal joint preferably involves the formation of a hollow head or eye on the end of the rod through which a pivot mounting pin projects with a bushing of rubber or other elastic deformable material interposed between the pin and the eye, as shown at 24 in Figure 5. Similar elastic pivot joints can be provided at the ends of each of the several radius rods 22 and 23. Rubber bumpers 25 are carried by the body for engagement with parts of the axles as cushion limit stops for extreme deflection as permitted by the elastic springs.

Each side spring at the rear of the vehicle consists of a compressible body of air or other elastic fluid and as shown in the drawing is confined within a flexible enclosure consisting primarily of a pair of cylindrical tanks 26 and 27 and a series of collapsible bellows or air bags 28—28. In the compression and expansion of the load supporting air the folds of the bellows will be crowded together or distended for accommodating relative movement between the axles and the body and distribute the load at the rear of the body upon the two axles. Conveniently the air bags are arranged on the vertical axis and may be formed of a tube-like wall of rubberized fabric with two folds with the neck between the folds being encircled by a steel ring 29 which resists outward deflection. Clamping rings 30—30 secure the opposite ends of the bellows in sealed relation to seats on the axle and the body, respectively. The upper seat for the spring clamped to the rear trailing axle seat 16' includes a casting 31 having a hollow passage therein which communicates the interior of the bellows through an elbow fitting 32 with a tubular fitting 33 carried by the tank 27. The two bellows which are mounted on the spring seats 16 have their upper ends joined to castings 34—34 from each of which hollow pipe fittings 35—35 extend in opposite directions. Two of these fittings which extend toward each other from the neighboring castings 34 are joined together while the remote fittings are joined one to a hollow fitting 36 of the tank 26 and the other by means of a flexible coupling 37 to a fitting 38 communicating with the tank 27. All of these several parts cooperate in the confinement of the air spring and in the free open communication between the several collapsible bellows and the volume increasing inflexible wall reservoirs. Thus, the pressure of the body of air entrapped by each spring and the corresponding reservoir or air container together with the passageway therebetween (e. g. the rearward spring 28, the elbow fitting 32, the fitting 33 and the reservoir 27) varies substantially uniformly incident to the operation of the spring. The diameters of the conduits, as 32, 33, interconnecting the several bellows springs and reservoirs associated with the tandem axles is not such as to have any restrictive importance within the limits of the frequencies of the vibrations involved. In other words, the diameter or cross section of each of these conduits or passageways is sufficient to prevent any substantial pressure drop thereacross incident to the operation of the springs. For better equalization of pressure it will be noted that the reservoir 27, which is interposed between two adjoining bellows, has a volume approximately twice that of the reservoir 26 beyond one end of the series of bellows. For the utmost utilization of space the reservoirs 26 are disposed transversely of the vehicle and immediately under the floor in close proximity to the several bellows 28.

For properly supporting the load the air constituting the confined elastic column will need to be under pressure and the pressure necessarily is related to the amount of the load to be carried. Each spring will be inflated from a suitable air supply source, such as the air storage tank of the compressor air system usually installed on larger vehicles and utilized for various auxiliaries, such as the vehicle brakes, the door operating motors and the like. For maintaining uniform spacing between the axles and the body, or in other words regulating the height of the floor above the ground, each air reservoir 27 has a pipe line connection with the air storage tank 39 in Figure 6 and the spring air pressure is controlled by a leveling valve 40 and which valve controls the pressure within both springs at the rear of the vehicle. A valve suitable for use will correspond generally to that disclosed in copending patent application Serial No. 5169, filed January 29, 1948 in the name of Edwin F. Rossman. It will include a casing mounted on the body and having an operating arm 41 linked with the axle so that when the body tends to move under load toward the ground the operating lever will cause a valve response which delivers additional air under pressure to the springs. In like manner, when the body tends to move upwardly above the predetermined level the valve response vents the load carrying spring to atmosphere and thereby reduces pressure and restores the body to the desired height. A time delay in the nature of a dashpot incorporated within the valve will preclude valve operation in response merely to ordinary road bumps which are of momentary duration.

A similar control valve 42 mounted at the front of the vehicle and having an operating lever 43 linked to the front axle 44 regulates the height of the front end of the vehicle independently of the rear loading by controlling air pressure within the front springs either by venting the front springs or supplying additional air under pressure from the main air supply tank 39. The two front axle springs each include a long and narrow cylindrical tank 45, whose walls are inflexible, and a pair of bellows 46—46 fastened at their upper ends to the bottom of the tank 45 and in open communication therewith. At their lower ends the two air bags 46 are clamped to spring seats afforded by arms 47 projecting laterally from the axle 44 on opposite sides thereof. These springs are located between the tops of the wheels and under the low level floor and directly beside the depressed aisle 2 so as to afford ample clearance for the dirigible wheels 48 on opposite ends of the front axle 44. This arrangement of the bellows assists in cushioning braking torque on the front axle but because of the inherent lack of lateral stability of the air bags it is desirable to tie the axle to the body by radius rods, including a longitudinal set of rods 49 pivotally mounted at opposite ends and arranged one above the wheel axis and the other two below the wheel axis and in transversely spaced relation. A transverse stabilizer or thrust bar 50 is pivotally joined at opposite ends to the body and the axle and cooperates with the longitudinal radius rods in confining relative movement to the vertical direction in which the air bags are disposed for response of the air column to compression and expansion in cushioning the load imposed thereon.

As in the case of the rear air springs 28, the body of air confined by each spring 46, the corresponding passageway (60, Fig. 4) and the associated reservoir or air chamber varies substantially uniformly incident to the operation of the spring, there being no significant pressure drop across the passageway.

We claim:

1. In a vehicle including a front axle having steerable wheels at opposite ends, a rear axle having drive wheels at opposite ends and an undercarriage supporting bolster above said rear axle, a vehicle undercarriage having a low level floor structure over the front axle and a high level floor structure over the rear axle, and radius rods connecting each axle to the undercarriage, air springs interposed between the low level floor structure and the front axle and between the high level floor structure and the rear axle bolster supporting said floor structure, and means controlling air pressure within said air springs including a pair of delayed action valves supported by said undercarriage, operating linkage connecting said valves to the axles for operating said valves responsive to variations in space between the axles and the undercarriage, one valve controlling front air spring pressure and the other valve controlling the rear air spring pressure, said valves venting the air springs for air pressure reduction when said space increases and supplying additional air for pressure increase when said space decreases whereby to avoid prolonged space variation and to restore normal spacing between the axles and the undercarriage.

2. In a vehicle suspension system, a pair of transversely spaced road wheels, an elevated body floor spaced above the tops of said wheels, an axle structure for said wheels including a vertically disposed riser traversing the space therebetween and terminating in a pair of spring seats, each disposed adjacent the top of one of said wheels, air springs mounted on said spring seats and resiliently supporting the body floor, and an inflexible air container associated with each of said springs, each of said air containers having a capacity greater than that of the corresponding spring and being interconnected therewith via a passageway of a cross section sufficient to prevent any substantial pressure drop across the passageway incident to the operation of the spring, whereby the pressure of the body of air entrapped by said container, said spring and said passageway varies substantially uniformly.

3. In a vehicle suspension system, a pair of transversely spaced road wheels, an axle structure terminating in a pair of spindles for said wheels and formed as a riser including portions mounting a pair of spring seats adjacent the tops of said wheels, an air spring carried on each said seat to resiliently support the body floor of the vehicle and an inflexible air container associated with each of said air springs, each of said containers having a capacity greater than that of the corresponding spring and being interconnected therewith via a passageway of a cross section sufficient to prevent any substantial pressure drop across the passageway incident to the operation of the spring, whereby the pressure of the body of air entrapped by said container, said spring and said passageway varies substantially uniformly.

4. In a vehicle suspension system, an engine driven axle having traction wheels at the opposite ends thereof and differential gearing between the wheels, a riser extending upwardly from said axle to points adjacent the tops of said wheels, a drive shaft for said differential gearing, a second axle in trailing tandem relation to said first axle and terminating at either end in a spindle having a wheel mounted thereon, said second axle being formed as a riser and bridging said drive shaft at a level upwardly of the axes of said last-mentioned wheels, and air springs supported by said first riser at said points adjacent the tops of said first-mentioned wheels and by said second axle adjacent the tops of the trailing wheels, the springs at each side being in open communication with one another via a passageway of cross section sufficient to prevent any substantial pressure drop across the passageway incident to the operation of the spring, whereby the pressure of the body of air entrapped by said springs and the said passageway varies substantially uniformly.

5. In a vehicle including a body structure having a low level floor at one end and a high level floor at the other end, an axle below each floor, a bolster forming a part of the axle under the high level floor, pneumatic springs mediate said bolster and the body structure and between said first-mentioned axle and the body structure providing elastic support in a vertical plane, elements linking each axle to the body structure adapted to take transverse and longitudinal thrust, a source of air under pressure carried by the vehicle and connected to the pneumatic springs, and separate valve means in circuit with said source and each set of said springs for maintaining the body of the vehicle at a constant level during loading and unloading operations by increasing the air pressure in the springs as the load increases and releasing air therefrom as the load decreases, each of said valve means including a part connected to the body structure of the vehicle and a part connected to the axle corresponding to the springs controlled thereby.

6. In a vehicle including a pair of axles having road wheels at the opposite ends thereof, and a load carrying body having dual level flooring with the lower level extending over one of said axles and below the tops of the wheels thereon and the higher level extending over the other axle and above the tops of the wheels thereon, a bolster on said last-mentioned axle projecting upwardly to points adjacent the tops of the wheels at the ends of such axle, a set of air springs mediate the high level floor and the said points and a second set between the low level floor and the corresponding axle, a source of compressed air carried by the vehicle and connected to said air springs, thrust linkage members interconnecting said axles and said body for transverse and longitudinal stability, and separate valve means in circuit with said source and each set of said air springs for maintaining the body of the vehicle at a constant level during loading and unloading operations by increasing the air pressure in the springs as the load increases and releasing air therefrom as the load decreases, each of said valve means including a part connected to the body structure of the vehicle and a part connected to the axle corresponding to the springs controlled thereby.

7. In a vehicle including an axle having road wheels at the opposite ends thereof and a body including a load carrying deck overlying the axle, said load carrying deck comprising a centrally depressed aisle at a level below the tops of said wheels, a pair of laterally spaced longitudinally disposed air tanks through which said load carrying deck is supported from said axle, these air tanks being positioned at opposite sides of said aisle, a pair of laterally spaced arms supported on said axle in underlying parallel relation to said tanks, a pair of longitudinally spaced seats on each arm located at opposite sides of said axle, an air spring mounted on each seat and connected with the tank thereabove through a passageway of a cross section sufficient to prevent any substantial pressure drop thereacross incident to the operation of the spring whereby the pressure of the body of air entrapped by said container, said spring and said passageway varies substantially uniformly, and thrust linkage members interconnecting said axle and said body for transverse and longitudinal stability.

8. In a vehicle suspension system, in combination, a load carrying body, a pair of tandem axles at one end of said body, road wheels mounted at the opposite ends of each axle, laterally spaced groups of bellows type air springs at opposite sides of the vehicle mediate said axles and said body, a source of compressed air for said springs, separate air chamber means mediate said source and each group of said springs, each of said air chamber means being in open communication with each spring in the corresponding spring group, the operation of the springs being accompanied by alternate increase and decrease in the air volume and pressure within the said chamber means, and valve means in the air circuit for maintaining the said body at a constant level during loading and unloading operations by increasing the air pressure in said springs as the load increases and releasing air therefrom as the load decreases, said valve means comprising a part connected to said body and a part connected to one of said axles.

9. In a vehicle suspension system, a pair of transversely spaced road wheels, a body floor, an axle structure for said wheels mounting a pair of spring seats, air springs on said seats resiliently supporting said floor and an inflexible air container associated with each of said springs, each of said air containers having a capacity greater than that of the corresponding spring and being interconnected therewith via a passageway of a cross section sufficient to prevent any substantial pressure drop across the passageway incident to the operation of the spring, whereby the pressure of the body of air entrapped by said container, said spring and said passageway varies substantially uniformly.

References Cited in the file of this patent

UNITED STATES PATENTS

| Number | Name | Date |
|---|---|---|
| 1,177,142 | Rudd | Mar. 28, 1916 |
| 1,337,501 | Arluskes | Apr. 20, 1920 |
| 1,673,467 | Maurer | June 12, 1928 |
| 1,727,721 | Langlands et al. | Sept. 10, 1929 |
| 1,835,112 | Hawkins | Dec. 8, 1931 |
| 1,928,684 | Carlson | Oct. 3, 1933 |
| 2,165,795 | Holmstrom | July 11, 1939 |
| 2,180,860 | Brown | Nov. 21, 1939 |
| 2,290,620 | Brown | July 21, 1942 |
| 2,361,575 | Thompson | Oct. 31, 1944 |
| 2,488,288 | Gouirand | Nov. 15, 1949 |
| 2,537,637 | Candlin, Jr. | Jan. 9, 1951 |

FOREIGN PATENTS

| Number | Country | Date |
|---|---|---|
| 2,442 | Great Britain | 1914 |
| 7,295 | Great Britain | 1910 |
| 20,811 | Great Britain | 1901 |
| 502,068 | Great Britain | Mar. 10, 1939 |
| 502,623 | Germany | July 16, 1930 |
| 519,877 | Great Britain | Apr. 9, 1940 |
| 843,699 | France | Apr. 3, 1939 |